US009941691B2

(12) United States Patent
Strangfeld et al.

(10) Patent No.: US 9,941,691 B2
(45) Date of Patent: Apr. 10, 2018

(54) ARRANGEMENT FOR OVERLOAD PROTECTION FOR OVERVOLTAGE PROTECTION EQUIPMENT

(71) Applicant: DEHN + SÖHNE GMBH + CO. KG, Neumarkt (DE)

(72) Inventors: Uwe Strangfeld, Nürnberg (DE); Bernhard Krauss, Berg (DE); Michael Waffler, Neumarkt (DE); Stephan Hierl, Neumarkt (DE)

(73) Assignee: DEHN + SÖHNE GMBH + CO. KG., Neumarkt (DE)

( * ) Notice: Subject to any disclaimer, the term of this patent is extended or adjusted under 35 U.S.C. 154(b) by 169 days.

(21) Appl. No.: 14/778,899

(22) PCT Filed: Mar. 27, 2014

(86) PCT No.: PCT/EP2014/056161
§ 371 (c)(1),
(2) Date: Sep. 21, 2015

(87) PCT Pub. No.: WO2014/166751
PCT Pub. Date: Oct. 16, 2014

(65) Prior Publication Data
US 2016/0204599 A1    Jul. 14, 2016

(30) Foreign Application Priority Data

Apr. 11, 2013  (DE) .................. 10 2013 006 233
Nov. 18, 2013  (DE) .................. 10 2013 019 391

(51) Int. Cl.
*H02H 9/04*        (2006.01)
*H01H 37/76*       (2006.01)
(Continued)

(52) U.S. Cl.
CPC .............. *H02H 9/04* (2013.01); *H01C 7/126* (2013.01); *H01H 37/767* (2013.01); *H01T 1/14* (2013.01);
(Continued)

(58) Field of Classification Search
CPC ................................. H02H 9/04; H01H 37/767
See application file for complete search history.

(56) References Cited

U.S. PATENT DOCUMENTS

| 6,282,073 B1 * | 8/2001 | Glaser | H02H 9/042 361/103 |
| 7,974,063 B2 * | 7/2011 | Vo | H01T 1/14 361/119 |

(Continued)

FOREIGN PATENT DOCUMENTS

| DE | 31 11 096 | 9/1982 | ............... H02H 9/06 |
| DE | 195 45 505 | 5/1997 | ............... H01C 7/12 |

(Continued)

OTHER PUBLICATIONS

Notification Concerning Transmittal of International Preliminary Report on Patentability (Chapter I of the Patent Cooperation Treaty), in English, dated Oct. 22, 2015, the International Preliminary Report on Patentability (Chapter I of the Patent Cooperation Treaty), in English, dated Oct. 13, 2015, the Written Opinion of the International Searching Authority, in English (dated Jun. 12, 2014—mailed with the Notification Concerning Transmittal of International Preliminary Report on Patentability), and the International Search Report, in English, dated Jun. 12, 2014, which were issued by the International Bureau of WIPO in Applicant's corresponding international PCT application having Serial No. PCT/EP2014/056161, dated Mar. 27, 2014.

*Primary Examiner* — Scott Bauer
(74) *Attorney, Agent, or Firm* — Bodner & O'Rourke, LLP; Gerald T. Bodner; Christian P. Bodner

(57) ABSTRACT

The invention relates to an arrangement for overload protection for overvoltage protection equipment that has at least one voltage-limiting element and at least one voltage-switching element, and optionally with a back-up fuse, wherein the voltage-limiting element is in the form of a varistor and the voltage-switching element is in the form of a spark gap and these elements are connected in series. According to the invention, to protect against inadmissible pulsed currents, the voltage-limiting element in the series circuit has a monitoring spark gap, forming a bypass, connected in parallel with it. Furthermore, a monitoring device, e.g. a thermal monitoring device, is provided that bypasses both the monitoring spark gap and the voltage-switching element in the event of ageing effects, inadmissibly high mains voltages and/or low-energy, periodic, high-frequency overvoltages.

6 Claims, 4 Drawing Sheets

Figure 1A:
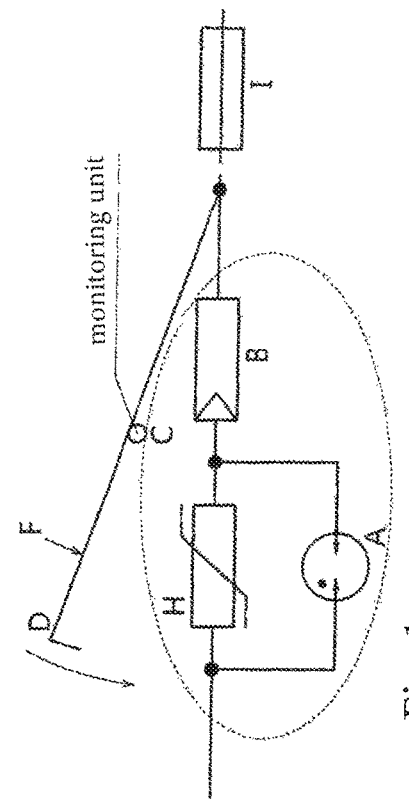

(51) Int. Cl.
*H02H 3/20* (2006.01)
*H01C 7/12* (2006.01)
*H01T 1/14* (2006.01)
*H02H 9/06* (2006.01)

(52) U.S. Cl.
CPC ............ *H02H 3/205* (2013.01); *H02H 9/043* (2013.01); *H02H 9/06* (2013.01)

(56) References Cited

U.S. PATENT DOCUMENTS

| | | | |
|---|---|---|---|
| 8,203,819 B2 | 6/2012 | Bobert | 361/124 |
| 2009/0128978 A1 | 5/2009 | Vo et al. | 361/119 |
| 2009/0154044 A1* | 6/2009 | Crevenat | H02H 9/06 361/91.1 |

FOREIGN PATENT DOCUMENTS

| | | | | |
|---|---|---|---|---|
| DE | 10 2008 022794 | | 8/2009 | ............... H01T 1/14 |
| DE | 10 2008 013447 | | 9/2009 | ............... H01C 7/12 |
| EP | 1 376 811 | | 1/2004 | ............... H02H 3/20 |

* cited by examiner

ARRANGEMENT FOR OVERLOAD PROTECTION FOR OVERVOLTAGE PROTECTION EQUIPMENT

The invention relates to an arrangement for overload protection of overvoltage protection devices comprising at least one voltage-limiting element and at least one voltage-switching element as well as an alternative series fuse, wherein the voltage-limiting element is designed as a varistor and the voltage-switching element as a spark gap and these elements are connected in series as per the preamble of claim 1.

Providing electrical systems with overvoltage protection devices to protect against inadmissibly high voltages is known. Overvoltage protection devices typically comprise voltage-switching and voltage-limiting elements to perform the desired electrical functions.

Yet lightning or overvoltage protection devices themselves also need to be protected against potential overloading, e.g. from transient events such as lightning surges or switching surges as well as also from so-called temporary operating frequency overvoltages (TOV). External or internal series fuses can be used for this purpose.

Direct protection is necessary when using voltage-limiting protective components, e.g. metal oxide varistors, because when a voltage-limiting protective component is damaged, it not only impacts components physically neighboring the overvoltage protection device but there is also the risk of the device itself being completely destroyed along with any respective peripheral devices.

DE 10 2008 022 794 A1 discloses an electrical protective element having a short-circuiting device comprising a gas-filled surge arrester with two or three electrodes. One of the electrodes is in each case disposed at the ends of the surge arrester. The protective element additionally has a thermal short-circuiting device. Same comprises a clip having at least two sections. A first section of the clip is snapped onto the surge arrester. A second section at least partly surrounds the first section and is spaced apart from the first section by a fusible element. One end of the second section in turn has a shorting clip. This shorting clip electrically connects the aforementioned electrodes of the surge arrester when the fusible element melts.

In a further embodiment, the surge arrester comprises three electrodes and is designed as a ceramic hollow body. The third electrode separates the hollow body into two parts here. The central electrode projects into the aforementioned space in direct contact with the fusible element.

The fusible element is preferably disposed so as to space the shorting clip at a distance from the external electrodes. When the fusible element melts, the clip presses on the external electrodes of the surge arrester and connects them together. When a surge arrester has an additional central electrode, the shorting clip connects the external electrodes to the central electrode.

Although the surge arrester provided in the known solution can protect itself against overload, it is not so easy to realize protection of voltage-limiting elements within an overvoltage protection device comprising a plurality of structural components.

Based on the foregoing, the invention thus addresses the task of specifying a further-developed arrangement for overload protection of overvoltage protection devices. The overvoltage protection device comprises at least one voltage-limiting element as well as at least one voltage-switching element and is provided with or connected to a series fuse. The voltage-limiting element is preferentially designed as a varistor (MOV) and the voltage-switching element as a spark gap or gas arrester (GDT). The former elements are connected in series with the series fuse.

According to the task, all the components should be protected as aforementioned and the overvoltage protection device be able to deactivated upon overloading. The arrangement is to thereby protect against overloading by high pulsed currents, but also ensure protection upon inadmissibly high heating of the overvoltage-limiting elements.

This task of the invention is solved by an arrangement in accordance with the feature combination of claim 1, wherein the subclaims at the least constitute advantageous embodiments and further developments.

One therefore proceeds from an arrangement for overload protection of overvoltage protection devices which comprises at least one voltage-limiting element as well as at least one voltage-switching element and can supplementally have a series fuse. The voltage-limiting element is preferentially designed as a varistor and the voltage-switching element is preferentially designed as a spark gap or gas discharge arrester. The aforementioned elements are connected in series.

According to the invention, in order to protect against inadmissible pulsed currents, the voltage-limiting element in the series connection has a parallel-connected monitoring spark gap forming a bypass.

A thermal monitoring device is furthermore provided which, upon the effects of aging, inadmissibly high main system voltages and/or low-energy, periodic, high-frequency pulses, bypasses both the monitoring spark gap as well as the voltage-switching element in order to activate the series fuse to protect the structural elements.

The thermal monitoring device is structurally connected to the spark gap and has a contact which short circuits the series connection of monitoring spark gap and spark gap of the voltage-switching element.

In one preferential embodiment, the inventive arrangement is formed on a circuit board, e.g. a printed circuit board, wherein the circuit board accommodates the voltage-limiting as well as the voltage-switching element, the series fuse, the monitoring spark gap and the thermal monitoring device.

As mentioned above, the voltage-switching element can be designed as a gas arrester and the voltage-limiting element as a varistor.

In another preferential embodiment of the invention, the thermal monitoring device is designed as a solder preform disposed in heat-transferring proximity to the gas arrester, wherein a spring-loaded clip released by the melting preform triggers or effects the monitoring function.

In an alternative solution thereto, a slider can strike the gas discharge arrester and its solder mounting to the circuit board, triggering or producing the bypass function upon the melting of the solder mounting.

The slider can likewise be preloaded in the direction of the solder mounting, for example by means of a spring.

In another preferential embodiment, a wrap spring is provided which produces the desired preload force and simultaneously constitutes a conductive part of the bypass.

To this effect, the wrap spring exhibits two spring ends and a body, wherein a first spring end is supported on the circuit board and a second spring end is supported on the solder preform or the slider.

The wrap spring is fixed to the series fuse in electroconductive contact. Preferentially, the dimensions of the wrap spring can be configured so as to circumferentially surround a shell portion of the series fuse, wherein the present case assumes a cylindrical fuse design.

In conjunction hereto, it is possible for the circuit board to implement the necessary functions in the tightest space in direct proximity to the voltage-limiting, the voltage-switching and the fusing element without additional installation space being required.

The following will reference embodiments as well as figures in describing the invention in greater detail.

Figure 1B:
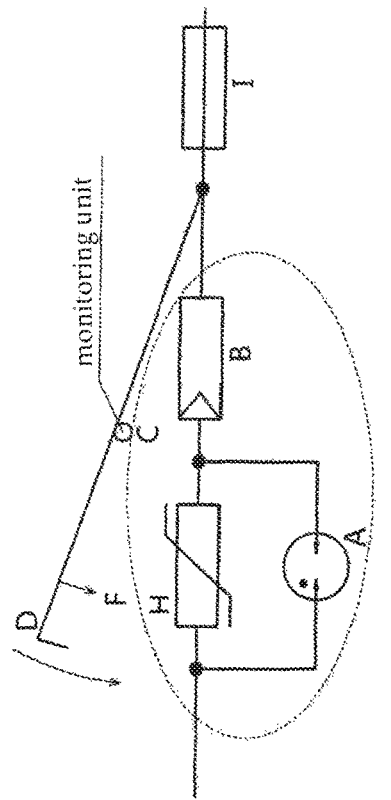
Figure 2A:
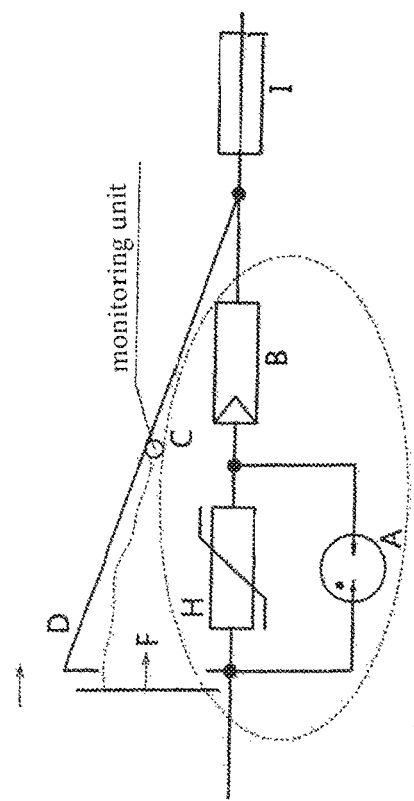
Figure 2B:
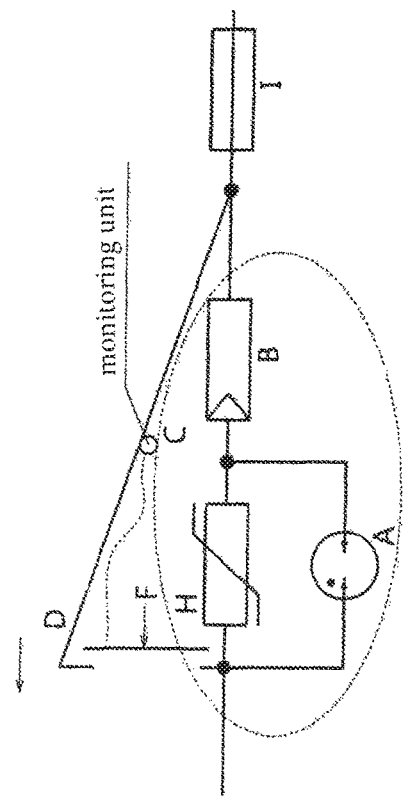
Figure 3A:
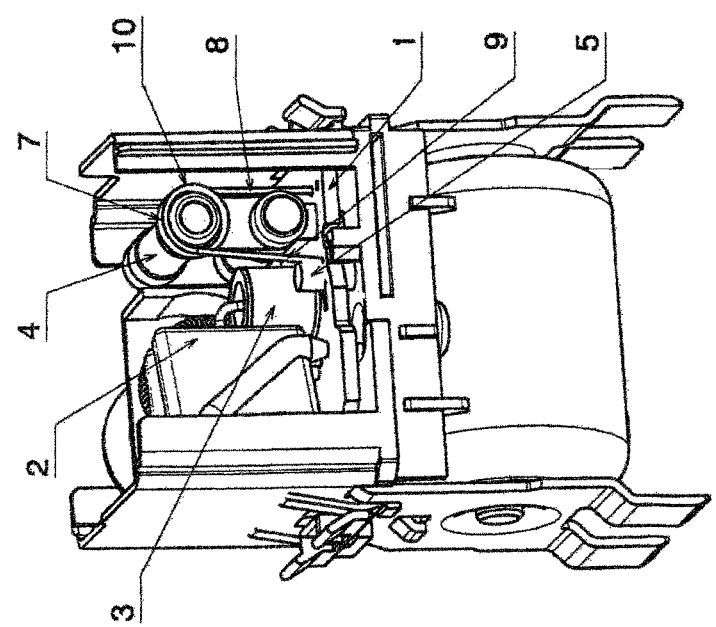
Figure 3B:
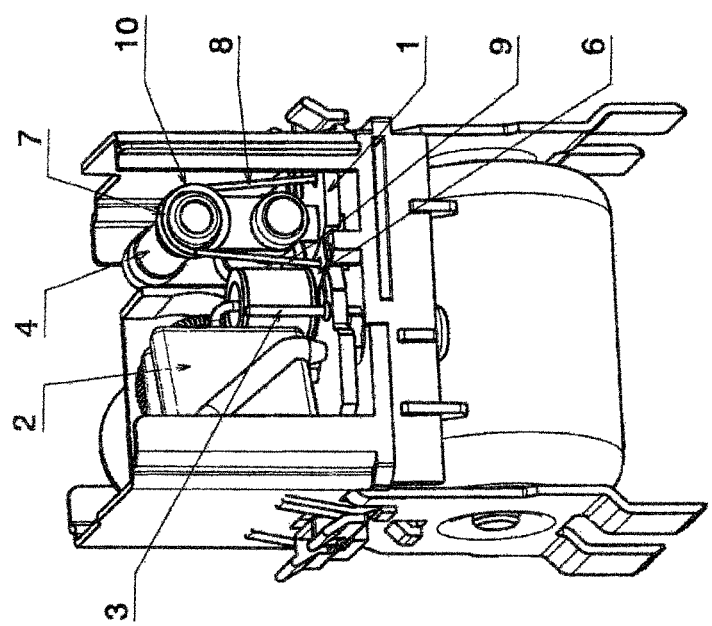
Figure 3C:
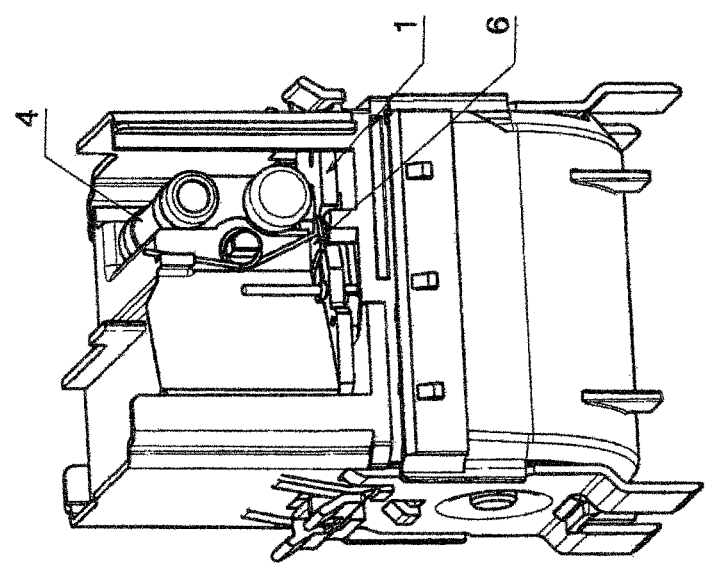

Hereby shown are:

FIG. 1a, 1b schematic circuit diagrams of the arrangement for overload protection of overvoltage protection devices with pushed or pulled shorting clip;

FIG. 2a, 2b schematic circuit diagrams of the monitoring device configuration with an element pulled or pushed into a short-circuit position; and FIG. 3a to c perspective illustrations of the inventive arrangement implemented on a printed circuit board within a overvoltage protection device, wherein parts of the external housing are not depicted so as to improve discernability.

A voltage-limiting element H designed as a varistor, constituting a component of the overvoltage protection device, is firstly to be assumed in the FIG. 1a, b and 2a, b depictions. The varistor H is a traditional series-connected discharge spark gap B. The series connection further encompasses a series fuse I.

In accordance with the invention, the varistor H is in parallel connection with a monitoring spark gap A which serves in protecting the varistor from being damaged by high pulsed currents. If the varistor H voltage drop exceeds the response voltage of the monitoring spark gap A, it will spark. The current then flows across the bypass as formed and the varistor H is discharged.

In order to prevent further aging damage on the components or damage due to inadmissibly high main system voltages resulting from malfunctions in primary voltage systems and/or low-energy, periodic, high-frequency surges which mostly occur during power conversions, a component of the overvoltage protection device, e.g. the spark gap B, is provided with a monitoring unit C as is illustrated schematically.

When it reaches its related limit temperature, an e.g. spring-loaded shorting clip D can short circuit the external electrodes of spark gaps A and B and thus prevent the imminent destruction of the varistor H and the spark gap B by overloading. The low-resistance short circuit induced thus provides the opportunity to trip the proposed series fuse I.

Thermally monitoring the spark gap B is opportune for a number of reasons. Firstly, it yields a simple and compact structural design enabling the smallest standard components to be used. The series connection of spark gaps can be of compact design so that the short-circuit device D can be arranged directly on a related assembly of components, thereby in effect providing a single compact structural element for its respective further processing.

When monitoring spark gap A is sparked due to there being too high of a voltage drop of parallel components, the current flows through the upstream fuse I and spark gaps A and B. Because of the individual spark gap arcs, the ensuing counter-voltage can become so large that the current flowing through the I+D+H series connection is insufficient to trip the fuse I. In this case, the current flow heats spark gap B, and thereby the thermal monitoring device, or short-circuiting device respectively, consisting of the thermal monitoring device C and shorting clip D so as to bypass the spark gap voltage drop.

In accordance with FIG. 1a, force F pushes the short-circuit device D configured as the shorting clip into the short-circuit position. It can be recognized from the schematic diagram of FIG. 1b that the shorting clip D is pulled into the short-circuit position by force F after the monitoring unit has been activated. The arrow depicted on F is significant in terms of the pushing or pulling of the shorting clip into the short-circuit position.

In accordance with FIG. 2a, after the monitoring unit has been activated, force F moves, preferentially pulls, a short-circuiting element into the short-circuit position. The arrow depicted on F is relevant hereto as well.

In accordance with FIG. 2b, after the monitoring unit has been activated, force F moves, preferentially pushes, a short-circuiting element into the short-circuit position, which is again symbolized by the depicted arrow.

FIGS. 3a to 3c illustrate different structural implementation possibilities of the inventive teaching.

In accordance with FIG. 3a, a solder preform disposed in direct proximity to a thermally monitored gas arrester is provided.

If overvoltages cause the inadmissible heating of the gas arrester, the solder preform melts. As shown in the figure, the arm of a wrap spring can then move to a contact pin disposed to the left of the solder preform and trigger a short circuit. The ensuing flow of current then trips the series fuse to which the wrap spring is fixed.

In the solution option according to FIG. 3b, a slider displaceable in the plane of the circuit board/printed circuit board is provided in the region of the gas arrester solder mounting.

When the gas arrester soldering point starts to melt in response to inadmissibly high heating, the slider, again supported by the force of the wrap spring, moves toward the contact pin (on the left in the figure) so as to produce a desired short circuit and enabling the series fuse to be tripped.

In the above-described solution options according to FIGS. 3a and 3b, the wrap spring assumes an electrical bypass device function. This electrical function can however also be realized, as depicted in FIG. 3c, by the slider being of conductive design. In this case, the wrap spring is not fixable to the fuse but to an extension of the housing.

The invention claimed is:

1. An arrangement for overload protection of overvoltage protection devices comprising at least one voltage-limiting element (H) and at least one voltage-switching element (B) as well as a series fuse (I), wherein the voltage-limiting element is designed as a varistor (H) and the voltage-switching element is designed as a spark gap (B) and these elements are connected in series, characterized in that to protect the voltage-limiting element (H), a monitoring spark gap or a monitoring gas arrester (A) forming a bypass is connected in parallel in the series connection and a monitoring device (C) is further provided which, upon the effects of aging, inadmissibly high main system voltages and/or low-energy, periodic, high-frequency pulses, bypasses either only the monitoring spark gap or monitoring gas arrester (A) respectively or the monitoring spark gap or monitoring gas arrester (A) and the voltage-switching element (B) subject to the counter-voltage of the voltage-switching element, wherein the monitoring device or the monitoring gas arrester (C) is structurally connected to the spark gap (B) and has a contact (D) which short circuits the series connection of monitoring spark gap (A) and spark gap of the voltage-switching element (B).

2. The arrangement according to claim 1, characterized in that
the series fuse (I) is connected in series with the voltage-switching element (B) and the voltage-limiting element (H).

3. The arrangement according to claim 2, characterized in that
the series fuse (I) is triggered by the bypassing to protect the structural elements.

4. An arrangement for overload protection of overvoltage protection devices comprising at least one voltage-limiting element (H) and at least one voltage-switching element (B) as well as a series fuse (I), wherein the voltage-limiting element is designed as a varistor (H) and the voltage-switching element is designed as at least one of a spark gap (B) and a gas arrester and these elements are connected in series,
characterized in that
to protect the voltage-limiting element (H), a monitoring spark gap or a monitoring gas arrester (A) forming a bypass is connected in parallel in the series connection and a monitoring device (C) is further provided which, upon the effects of aging, inadmissibly high main system voltages and/or low-energy, periodic, high-frequency pulses, bypasses either only the monitoring spark gap or monitoring gas arrester (A) respectively or the monitoring spark gap or monitoring gas arrester (A) and the voltage-switching element (B) subject to the counter-voltage of the voltage-switching element,
wherein same is formed on a circuit board (1) which accommodates the voltage-limiting (2) as well as the voltage-switching element (3), the series fuse (4), the monitoring spark gap or monitoring gas arrester and the thermal monitoring device,
wherein the thermal monitoring device is a solder preform (5) disposed in heat-transferring proximity to the gas discharge arrester (3), wherein a spring-loaded clip which triggers or effects the monitoring function is released by the melting preform (5),
wherein a wrap spring (7) is provided which produces the desired preload force and simultaneously constitutes a conductive part of the bypass, and
wherein the wrap spring (7) comprises two spring ends (8 and 9), wherein a first spring end (8) rests and/or is supported on the circuit board and a second spring end (9) on the solder preform (5) and the wrap body (10) of the wrap spring (7) is fixed on the series fuse (4) and in electrical contact with same.

5. An arrangement for overload protection of overvoltage protection devices comprising at least one voltage-limiting element (H) and at least one voltage-switching element (B) as well as a series fuse (I), wherein the voltage-limiting element is designed as a varistor (H) and the voltage-switching element is designed as at least one of a spark gap (B) and a gas arrester and these elements are connected in series,
characterized in that
to protect the voltage-limiting element (H), a monitoring spark gap or a monitoring gas arrester (A) forming a bypass is connected in parallel in the series connection and a monitoring device (C) is further provided which, upon the effects of aging, inadmissibly high main system voltages and/or low-energy, periodic, high-frequency pulses, bypasses either only the monitoring spark gap or monitoring gas arrester (A) respectively or the monitoring spark gap or monitoring gas arrester (A) and the voltage-switching element (B) subject to the counter-voltage of the voltage-switching element,
wherein same is formed on a circuit board (1) which accommodates the voltage-limiting (2) as well as the voltage-switching element (3), the series fuse (4), the monitoring spark gap or monitoring gas arrester and the thermal monitoring device,
wherein a slider (6) strikes the gas discharge arrester (3) and its solder mounting on the circuit board which triggers or effects the monitoring function upon the melting of the solder mounting,
wherein a wrap spring (7) is provided which produces the desired preload force and simultaneously constitutes a conductive part of the bypass, and
wherein the wrap spring (7) comprises two spring ends (8 and 9), wherein a first spring end (8) rests and/or is supported on the circuit board and a second spring end (9) on the slider (6) and the wrap body (10) of the wrap spring (7) is fixed on the series fuse (4) and in electrical contact with same.

6. The arrangement according to claim 5, characterized in that
the slider (6) is preloaded in the direction of the solder mounting.

* * * * *